United States Patent
Shimizu (10) Patent No.: US 9,143,252 B2
(45) Date of Patent: Sep. 22, 2015

(54) TRANSMISSION APPARATUS AND DATA COMMUNICATION CHANNEL PROCESSING METHOD

(75) Inventor: Takayuki Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1237 days.

(21) Appl. No.: 11/503,159

(22) Filed: Aug. 14, 2006

(65) Prior Publication Data

US 2007/0248004 A1 Oct. 25, 2007

(30) Foreign Application Priority Data

Apr. 21, 2006 (JP) ................. 2006-118391

(51) Int. Cl.
*H04J 1/16* (2006.01)
*H04J 3/14* (2006.01)
*H04L 12/26* (2006.01)

(52) U.S. Cl.
CPC ............... *H04J 3/14* (2013.01); *H04L 12/2602* (2013.01); *H04L 43/00* (2013.01)

(58) Field of Classification Search
CPC ........................... H04L 12/2602; H04L 43/00
USPC ......... 370/338, 401, 355, 392, 466, 219, 221, 370/442; 709/238; 398/59, 83, 167.5
See application file for complete search history.

(56) References Cited

U.S. PATENT DOCUMENTS

| | | | | |
|---|---|---|---|---|
| 4,964,095 A | * | 10/1990 | Tyrrell et al. | 370/221 |
| 5,787,085 A | * | 7/1998 | Fox | 370/392 |
| 6,473,414 B1 | * | 10/2002 | Hartley et al. | 370/338 |
| 6,952,395 B1 | * | 10/2005 | Manoharan et al. | 370/219 |
| 6,957,271 B1 | * | 10/2005 | Shimada | 709/238 |
| 7,042,872 B1 | * | 5/2006 | Burnett | 370/355 |
| 7,469,103 B2 | * | 12/2008 | Binetti et al. | 398/83 |
| 7,627,000 B2 | * | 12/2009 | Buckles et al. | 370/466 |
| 2002/0089996 A1 | * | 7/2002 | Komatsu et al. | 370/442 |
| 2004/0141758 A1 | * | 7/2004 | El-Reedy | 398/167.5 |
| 2006/0045104 A1 | * | 3/2006 | Buckles et al. | 370/401 |

(Continued)

FOREIGN PATENT DOCUMENTS

JP 2000-92085 3/2000
JP 2000-244562 9/2000

(Continued)

OTHER PUBLICATIONS

Japanese Patent Office Action dated Sep. 28, 2010 for corresponding Japanese Patent Application No. 2006-118391.

*Primary Examiner* — Mark Rinehart
*Assistant Examiner* — Gbemileke Onamuti
(74) *Attorney, Agent, or Firm* — Staas & Halsey LLP (57) ABSTRACT

The present invention is a transmission apparatus and a data communication channel processing method that make it possible to realize construction of a monitoring and controlling data communication network in accordance with a network management form desired by a user or an already existing network management form in a network conforming to SONET, SDH, etc., and the transmission apparatus is configured so as to comprise a data communication channel terminator for selectively performing termination processing of an signal received by a data communication channel in accordance with an area attribute setting and a data communication channel pass-through unit for passing through a signal for which termination processing is not performed by the data communication channel terminator to a transmission apparatus belonging to another area.

4 Claims, 11 Drawing Sheets

(56) References Cited

U.S. PATENT DOCUMENTS

2006/0051091 A1* 3/2006 Kinoshita et al. .............. 398/59
2006/0168247 A1 7/2006 Hunneyball

FOREIGN PATENT DOCUMENTS

| JP | 2000-250790 | 9/2000 |
| JP | 2005-534244 | 11/2005 |

* cited by examiner

Transport and STS Path Overhead Byte Designations

| | Transport Overhead | | | STS Path Overhead |
|---|---|---|---|---|
| Section | Framing<br>A1/Reserved[a] | Framing<br>A2/Reserved[a] | Trace/Growth<br>J0/Z0[b] | Trace<br>J1 |
| | BIP-8<br>B1/Undefined[b, c] | Orderwire<br>E1/Undefined[b, c] | User<br>F1/Undefined[b] | BIP-8<br>B3 |
| | ~~Data Com~~<br>~~D1/Undefined[b, c]~~ | ~~Data Com~~<br>~~D2/Undefined[b, c]~~ | ~~Data Com~~<br>~~D3/Undefined[b, c]~~ | Signal Label<br>C2 |
| Line | Pointer<br>H1 | Pointer<br>H2 | Pointer Action<br>H3 | Path Status<br>G1 |
| | BIP-8<br>B2 | APS<br>K1/Undefined[b, c] | APS<br>K2/Undefined[b, c] | User Channel<br>F2 |
| | Data Com<br>D4/Undefined[b, d] | Data Com<br>D5/Undefined[b] | Data Com<br>D6/Undefined[b, c] | Indicator<br>H4 |
| | Data Com<br>D7/Undefined[b, d] | Data Com<br>D8/Undefined[b] | Data Com<br>D9/Undefined[b, c] | Growth<br>Z3 |
| | Data Com<br>D10/Undefined[b, d] | Data Com<br>D11/Undefined[b] | Data Com<br>D12/Undefined[b, c] | Growth<br>Z4 |
| | Sync Status/Growth<br>S1/Z1/Undefined[b, c] | REI-L[e]/Growth<br>M1[f] or<br>M1/Z2/Undefined[b] or<br>M0&M1/Z2/Undefined[g] | Orderwire<br>E2/Undefined[b] | STS Tandem<br>Connection<br>N1 |

FIG. 10

TRANSMISSION APPARATUS AND DATA COMMUNICATION CHANNEL PROCESSING METHOD

CROSS REFERENCE TO RELATED APPLICATIONS

This application is based on and hereby claims priority to Japanese Application No. 2006-118391 filed on Apr. 21, 2006 in Japan, the contents of which are hereby incorporated by reference.

BACKGROUND OF THE INVENTION (1) Field of the Invention

The present invention relates to a transmission apparatus and a data communication channel processing method and, for example, to a transmission apparatus and a data communication channel processing method suitable to use for management (monitoring, control) of a network conforming to the SONET (Synchronous Optical Network) or the SDH (Synchronous Digital Hierarchy) system.

(2) Description of Related Art

At present, as a user network interface for realizing B-ISDN (Broadband aspects of Integrated Services Digital Network), SDH (Synchronous Digital Hierarchy) [referred to as SONET (Synchronous Optical Network) in North America] is standardized as an international standard for the purpose to integrate the already existing digital hierarchy in each country of the world.

Then, an example of the SONET/SDH network configuration is a network configuration comprising a data communication network (DCN:Data Communication Network) for transmitting data for monitoring and controlling a transmission apparatus (NE: Network Element), which is a component in the network, independently of a network for transmitting main signals.

In such a network, a monitoring and controlling terminal that functions as an NMS (Network Management System) for a SONET/SDH network communicates with an NE constituting the SONET/SDH network via the DCN and transmits and receives monitoring and controlling information for performing an NE control and a line control by, for example, an OSI (Open System Interconnection) packet, thereby performing monitoring and control of the NE constituting the SONET/SDH network (for example, operation setting of each NE and a line control when an alarm signal is detected).

By the way, the DCN is constructed so as to have a data communication channel (DCC: Data Communication Channel) terminated between NEs and an NE that generates and terminates the DCC and terminates a monitoring and controlling packet (OSI packet) included in the DCC, and further routes monitoring and controlling information between DCCs.

Figure 9:
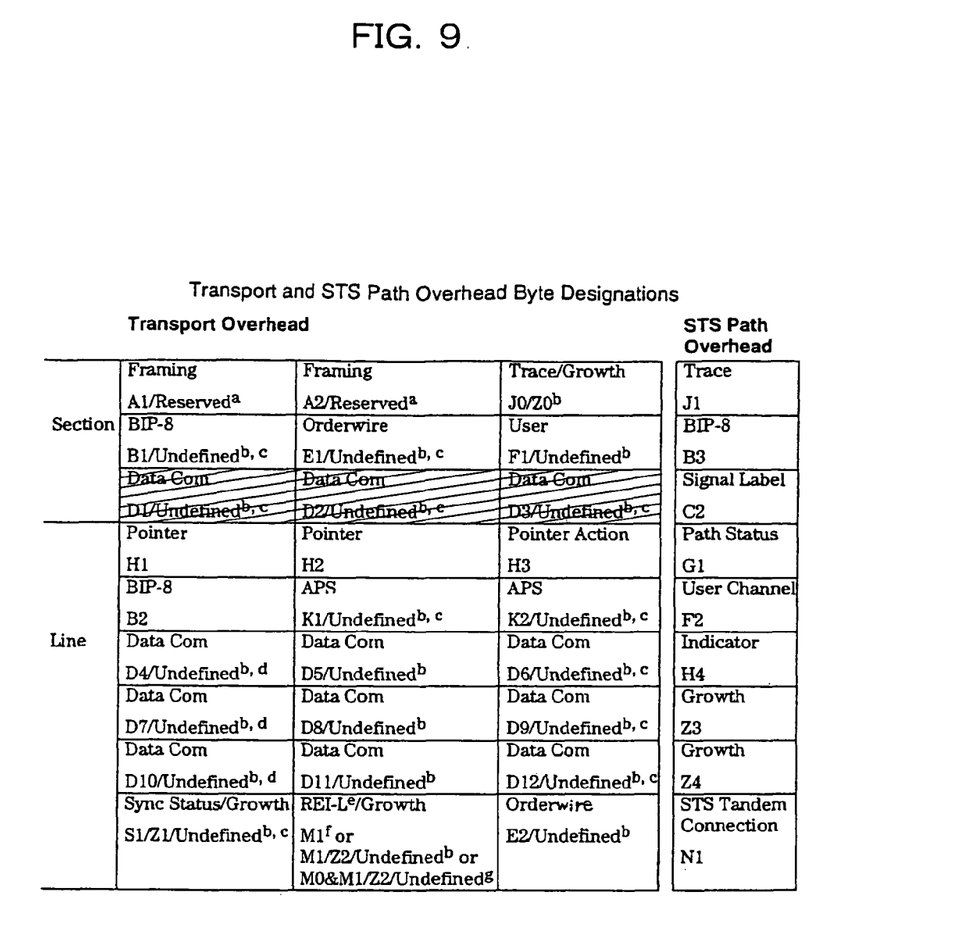
FIG. 9 is a diagram showing a SONET overhead byte on a main signal interface in a SONET/SDH network.

Further, the DCC transmits an OSI packet for monitoring and controlling the SONET/SDH network and the NE and an IP packet used for other purposes by using, for example, a part (for example, the three bytes in the third row shown by the diagonally shaded area in FIG. 9) of a section overhead (SOH) in a SONET overhead (Overhead Byte) on a main signal interface (main signal frame) shown in FIG. 9. For example, a TL1 message, an NE system software file and a database (DB) file, etc., are transmitted by the OSI packet.

Here, the SOH is information that is terminated both at a relay regeneration station (regenerator node) and at a terminal station (multiplexing/demultiplexing node) and in SONET, information that is also referred to as a line overhead (LOH) and terminated only at the terminal station is defined. For the LOH, a byte for the DCC is defined, however, the LOH is not used for the current network management because not terminated at a relay station.

Figure 10:
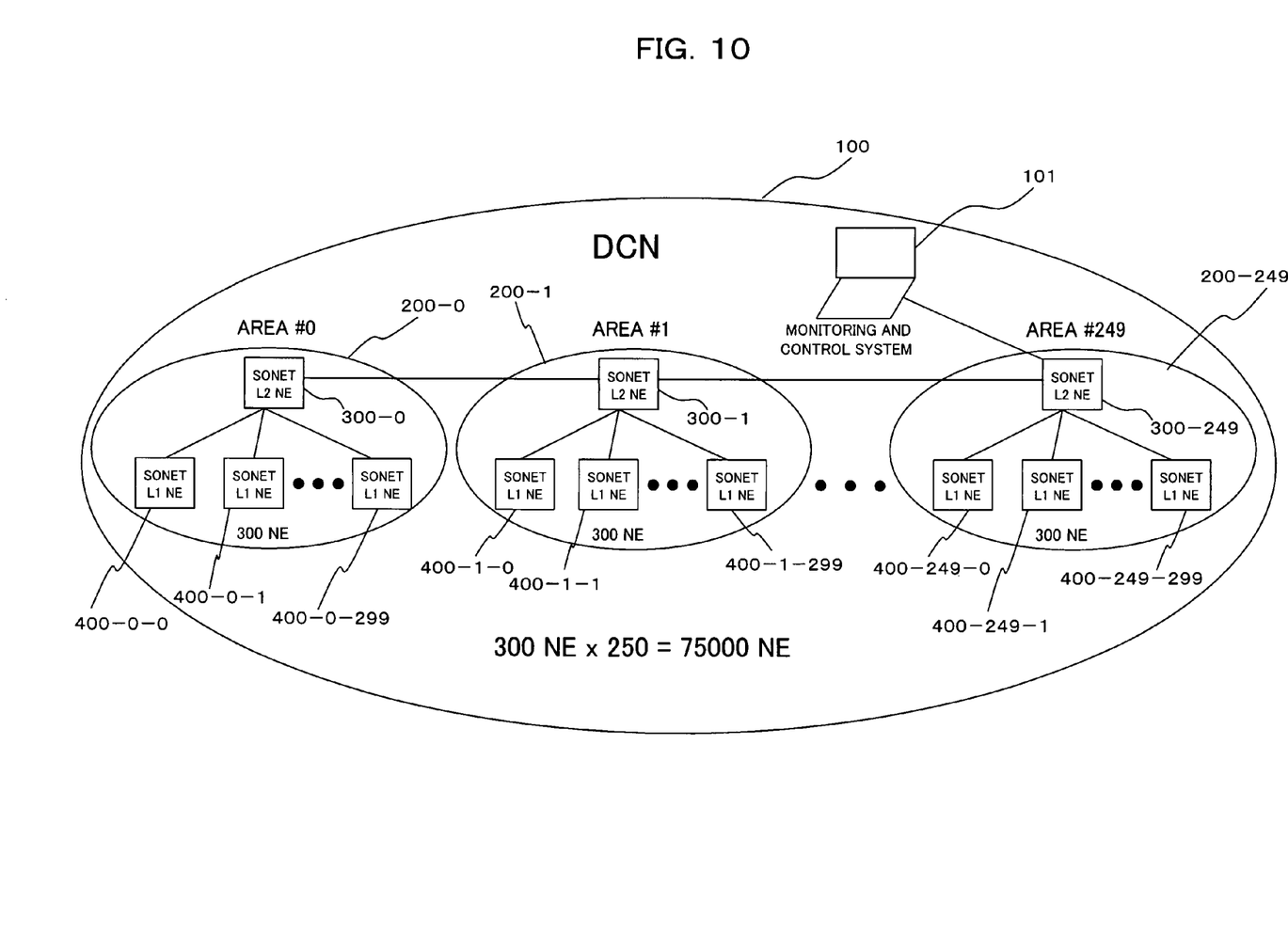
FIG. 10 is a block diagram showing a configuration of a conventional monitoring and controlling network.

As a form of a network that uses the above-described SONET/SDH (hereinafter, SDH is assumed to be included when indicated just as SONET), there is a network form, for example, as shown in FIG. 10.

The SONET/SDH network shown in FIG. 10 is configured so as to comprise a monitoring and controlling terminal (monitoring and controlling system) 101, SONET transmission apparatuses to be monitored and controlled, that is, level 2 (L2) SONET transmission apparatuses (SONET L2 NE) 300-M (simply referred to as "NE300" when a distinction is not made) and level 1 (L1) SONET transmission apparatuses (SONET L1 NE) 400-M-N (M=0, 1, 2, . . . , N=0, 1, 2, . . . ) (hereinafter, simply referred to as "NE400" when a distinction is not made) in one DCN 100 and these SONET transmission apparatuses 300 and 400 are managed (monitored and controlled) by the monitoring and controlling terminal 101 for each of areas 200-0 to 200-M (hereinafter, simply referred to as "area 200" when a distinction is not made).

In other words, the level 2 NE300-$i$ (i=0 to M) and the level 1 NE400-$i$-$j$ (j=1 to N) constitute one area 200-$i$ (#i) to be monitored and controlled and the NE group to be monitored and controlled is set with the area 200 as a unit. Here, the L2 NE300 means an NE, which is a communication gateway across the areas 200, and L1 NE400 means an NE other than that.

Then, the monitoring and controlling terminal 101 as an NMS hierarchically manages the NE 300, which is a communication gateway across the areas 200, and the NE 400 provided under the control of the NE 300, thereby the DCN 100 can be managed hierarchically for each area 200. Here, which of the areas 200 the NE 300 and NE 400 belong to is determined by, for example, a predetermined parameter set to the NE and the information (area attribute) can also be set by the DCC.

Now, all of the NEs (NE 300 and NE 400) existing in the DCN 100 manage the address information about all of the NEs within the capacity of a memory for managing address information and enable routing of the monitoring and controlling information among all of the NEs. Here, the memory for managing address information is provided to each NE (NE 300 and NE 400) and stores the address information, a routing table, etc.

In one DCN 100, up to M+1 (for example, 250) areas 200 can be managed and in each area 200, up to N+1 (for example, 300) units including the NE 300 and the NE 400 can be managed.

By such a hierarchical network management method, the NE 400 can manage as much information as necessary for the routing of the monitoring and controlling information (OSI packet) in the area 200 and the NE 300 can manage as much information as necessary for the routing within the local area 200 and between the areas 200, thereby it is made possible to transmit and receive the monitoring and controlling information among all of the NEs in the DCN 100.

By the way, the number of manageable areas (manageable upper limit area number: M+1) in one DCN 100 described above and the number of manageable NEs (manageable upper limit NE number: N+1) in one area 200 is limited by the memory size of the memory for managing address information provided in the NE and the search rate of the routing information, and in the most recent NE, for example, M+1=250 and N+1=300, approximately. This means that the NE 300 can manage up to 250 pieces of address information and the NE 400 can manage up to 300 pieces of address information of the NE in the area 200.

In other words, by using the hierarchical network management method as shown in FIG. 10, it is made possible to manage up to 300 (manageable upper limit NE number)×250 (manageable upper limit area number)=75000 NEs in one DCN 100 with the memory size of the memory for managing address information provided in the most recent SONET transmission apparatus.

Note that, in the patent document 1 to be described later, a label switching technology is disclosed, which combines an ATM switch and a data relay control device in order to transfer a large amount of data at high speed in an IP network, and cut-through transfer of data under specific conditions is also disclosed.

Further, in the patent document 2 to be described later, a control as to whether or not a packet is cut through based on mapping of the packet for considerably reducing routing processing in a packet transmission system is disclosed.

[Patent document 1] Japanese Patent Application Laid-Open No. 2000-92085

[Patent document 2] Japanese Patent Application Laid-Open No. 2000-244562

According to the technologies described above, in the most recent SONET transmission apparatus, up to 250 areas 200 can be managed in one DCN 100 and further by managing up to 300 NEs for each of the areas 200, up to 250×300=75000 NEs can be managed in one DCN 100, however, the hierarchical NE management with the presence of L1 and L2 NEs as shown in FIG. 10 is complex and not necessarily easy, therefore, some users may be reluctant to use and the number of NEs to be managed at the initial stage of the construction of a network is comparatively small, therefore, it is frequent that the NEs are managed only in the single area 200, not divided in the DCN 100 by the desire of a user.

In this case, up to N+1 (for example, 300 here) NEs can be managed in one DCN 100, however, when the number of NEs in the network increases by the coupling of a plurality of already existing networks, the expansion of a network, etc., there frequently occurs the case where the number of NEs in the DCN 100 exceeds the manageable upper limit NE number (here, N+1).

Figure 11:
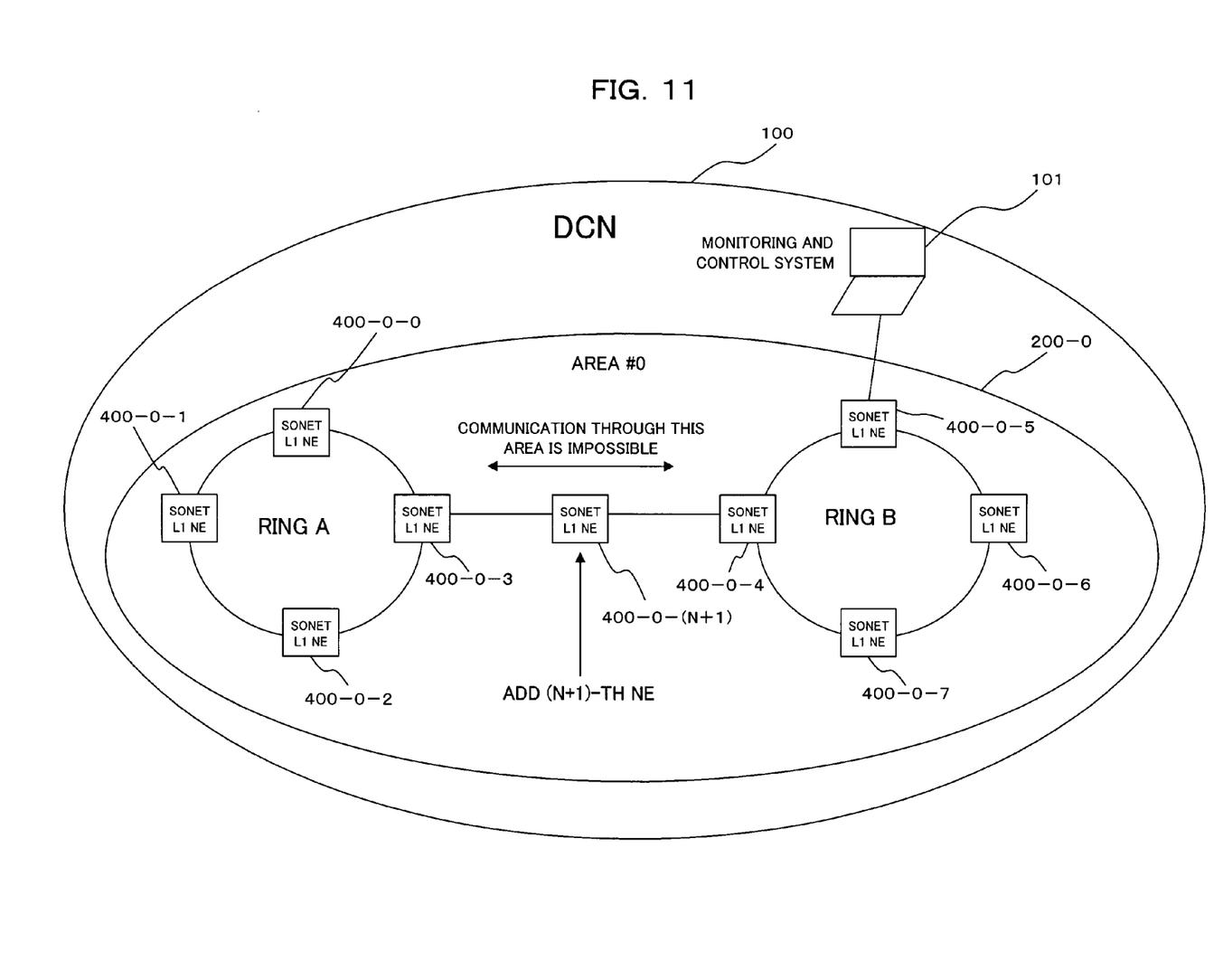
FIG. 11 is a diagram for explaining problems in the conventional monitoring and controlling network.

Here, the network state when the number of NEs in the DCN 100 exceeds the manageable upper limit NE number is explained by using FIG. 11.

For example, in a state in which the four NEs 400-0-0, 400-0-1, 400-0-2, and 400-0-3 constituting an already existing ring network (ring A) and the four NEs 400-0-4, 400-0-5, 400-0-6, and 400-0-7 constituting an already existing ring network (ring B) are managed as one area 200-0 by the monitoring and controlling system 101, as described above, each NE 400 manages address information of all the NEs 400 in the area 200-0 in a table.

Then, when a new NE 400-0-(N+1) is added in the area 200-0, the neighboring NEs 400-0-3 and 400-0-4 detect the addition of the NE 400-0-(N+1) and update the memory for managing address information (routing table) of the local station, and notify the other NEs 400 in the area 200-0 of the updated information. Due to this, the memory for managing address information of all the NEs 400 in the area 200-0 is updated.

When, however, a new NE 400-0-(N+1) is added in a state in which the number of NEs in the area 200-0 reaches the manageable upper limit NE number, it is not possible for each NE 400 in the area 200-0 to newly register the address information of the newly added NE 400-0-(N+1) to the memory for managing address information because of limitation of the memory size.

Therefore, it is not possible to communicate with the added NE 400-0-(N+1) and further, it is not possible to communicate with the NE 400-0-3 connected ahead of the NE 400-0-(N+1). As a result, a phenomenon occurs that monitoring and control of the NE 400 constituting the ring network A that is monitored and controlled hitherto cannot be performed any longer.

Further, when the already provided DCN 100 is constructed by one area 200-0, when the area management as shown in FIG. 10 is applied following an increase in the number of NEs, a review of the DCN architecture, an area resetting of the already provided NE, etc., are required, however, when such a setting is performed, communication via the NE 400 in question is disconnected in the meantime, therefore, monitoring and control of the NE 400 connected ahead of the NE 400 in question cannot be performed and there arises a problem that such a resetting cannot be performed for management.

Because of this, a method is demanded, which realizes addition of the NE 400 in the number exceeding the manageable upper limit NE number without the need to considerably modify the already provided network configuration (a configuration in which all of the NEs 400 present in a network are managed in one area 200-0).

The methods disclosed in the above-mentioned patent documents 1 and 2 are not aimed at the area management in the DCN 100, therefore, the above-mentioned problem cannot be solved.

SUMMARY OF THE INVENTION

The present invention has been developed in view of the above-mentioned problems, and an object thereof is to make it possible to realize construction of a data communication network for monitoring and control in accordance with a network management form desired by a user or an already existing network management form in, for example, the SONET/SDH network.

In order to attain the object, an embodiment of the present invention is characterized by using the following transmission apparatus and data communication channel processing method. In other words:

(1) The transmission apparatus according to an embodiment of the present invention is the one used in a network capable of monitoring and controlling a plurality of transmission apparatuses for each area by a data communication channel and characterized by comprising a data communication channel termination means for selectively performing termination processing of a signal received by the data communication channel in accordance with an area attribute setting for a local area and a data communication channel pass-through means for passing through a signal for which termination processing is not performed by the data communication channel termination means to a transmission apparatus belonging to an area other than the local area.

(2) Here, the data communication channel pass-through means may comprise a layer 2 termination processing section for performing termination processing of the signal for which termination processing is not performed to layer 2 level and extracting a signal at layer 3 level, a layer 3 identification section for identifying whether the signal at layer 3 level extracted by the layer 2 termination processing section is a specific monitoring and controlling signal, and a layer 3 pass-through processing section for, when the signal at layer 3 level is identified as the specific monitoring and controlling signal by the layer 3 identification section, passing through the monitoring and controlling signal by a data communication channel to the other transmission apparatus without performing termination processing.

(3) The data communication channel pass-through means may further comprise a layer 3 termination processing section for performing termination processing of the signal at layer 3 level when the signal at layer 3 level is identified as a signal other than the monitoring and controlling signal at layer 3 level by the layer 3 identification section.

(4) Furthermore, the present transmission apparatus may further comprise a plurality of ports provided in accordance with the plurality of data communication channels, a data communication channel cross connect processing section for selectively connecting between any of the ports, and a control means for performing the setting of pass-through by controlling the data communication channel cross connect processing section.

(5) The data communication channel processing method according to an embodiment of the present invention is characterized by using, in the transmission apparatus which is an element of a network capable of monitoring and controlling a plurality of transmission apparatuses for each area by a data communication channel, the method comprising, a termination processing step for selectively performing termination processing of a signal received by the data communication channel in accordance with an area attribute setting for a local area, and a data communication channel pass-through step for passing through a signal for which termination processing is not performed in the termination processing step to a transmission apparatus belonging to an area other than the local area.

According to the present invention described above, at least any of the following effects or advantages can be obtained.

(1) In the transmission apparatus, the signal received by the data communication channel is selectively subjected to termination processing in accordance with the area attribute setting for a local area and the signal for which termination processing is not performed is passed through to the transmission apparatus belonging to an area other than the local area, therefore, even if the number of transmission apparatuses to be monitored and controlled by the data communication channel increases, it is possible to easily perform management by dividing the area so that the number of transmission apparatuses that can be managed in one area is equal to or less than the maximum number by means of the area attribute setting. Therefore, it is possible to flexibly realize construction of a data communication network for monitoring and control in accordance with a network management form desired by a user or without the need to make a considerable modification to an already existing network management form.

(2) Further, if the signal for which termination processing is not performed is subjected to termination processing to layer 2 level and the signal at layer 3 level is extracted, and when the extracted signal at layer 3 level is identified as a specific monitoring and controlling signal, the monitoring and controlling signal is passed through to the other transmission apparatus by the data communication channel without performing termination processing, it is possible to accurately perform pass-through of the monitoring and controlling signal while performing necessary termination processing of the signal other than the monitoring and controlling signal among the signals at layer 3. Therefore, it is possible to realize construction of a data communication network by flexible area division while maintaining the compatibility of communication required between the transmission apparatuses by an already existing data communication channel.

(3) Then, if the data communication channel cross connect processing section is comprised, the pass-through can be set arbitrarily between any of the ports, therefore, it is possible to perform the pass-through setting freely for the data communication channel at an arbitrary port irrespective of the transmission rate of the main signal frame included in the data communication channel and the network form through which the main signal frame transmits, and to realize a more flexible network management form.

DESCRIPTION OF THE PREFERRED EMBODIMENTS

[A] Explanation of an Embodiment

Figure 1:
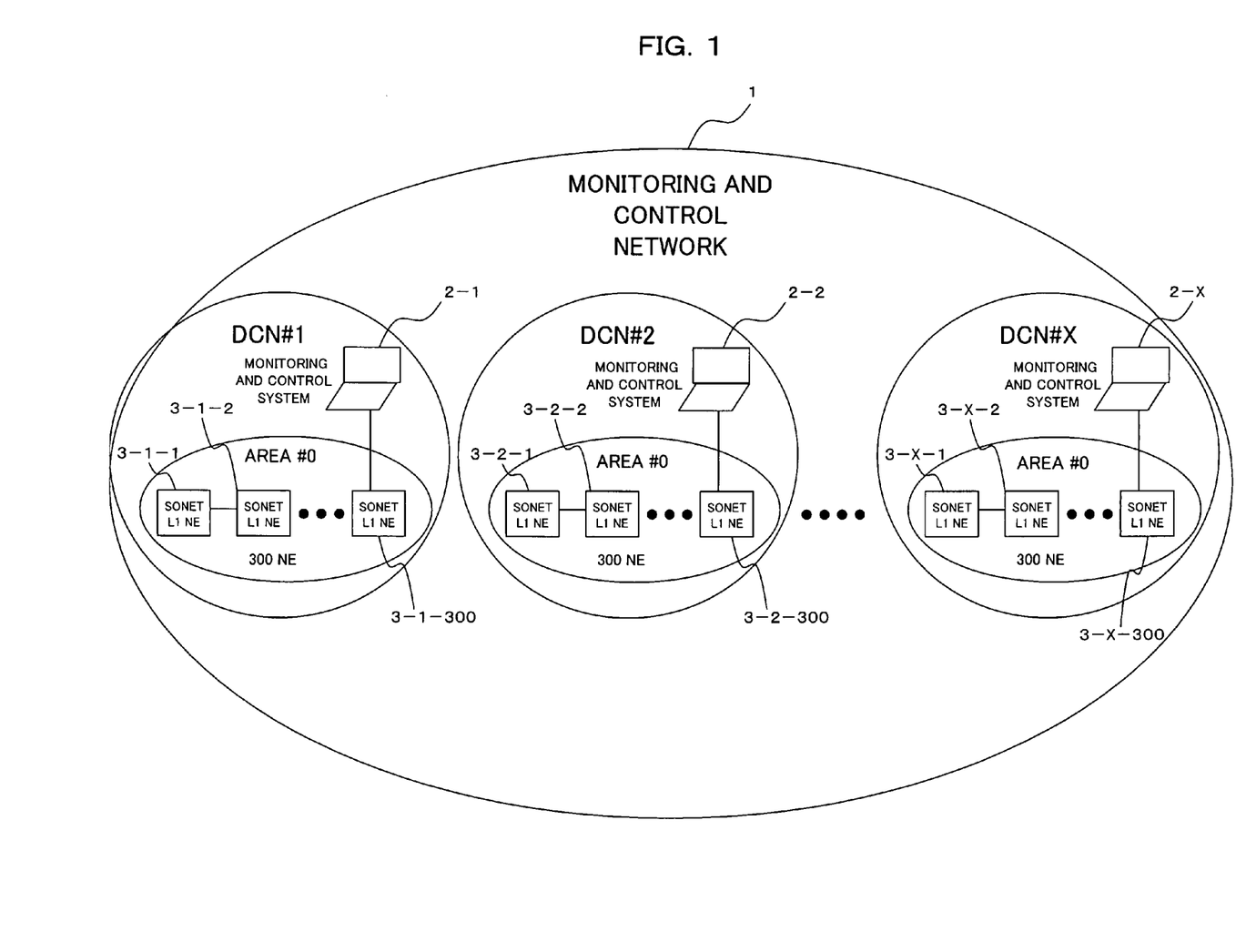
FIG. 1 is a block diagram showing a configuration of a monitoring and controlling network according to an embodiment of the present invention.

FIG. 1 is a diagram showing a configuration of a monitoring and controlling network according to an embodiment of the present invention.

As shown in FIG. 1, a monitoring and controlling network 1 according to the present embodiment is configured so as to comprise a plurality of data communication networks {DCN #X (X=1, 2, ...)} and each DCN #X is set as an object to be managed (monitored and controlled) by a monitoring and controlling terminal (monitoring and controlling system) 2-X (hereinafter, simply referred to as a "monitoring and controlling terminal 2" in some cases when a distinction is not made) with a plurality of level 1 (L1) SONET transmission apparatuses (SONET L1 NE) 3-X-Y (Y=1, 2, ...) (hereinafter, simply referred to as NE 3 in some cases when a distinction is not made) being as an NE group belonging to a single area #0. In other words, the monitoring and controlling network 1 is divided into a plurality of DCNs with a group of up to Y (for example, Y=300) NEs 3 belonging to the single area #0 being a unit of an object to be monitored and controlled.

Here, the monitoring and controlling terminal 2 monitors and controls the NE3 in each DCN #X and for example, detecting an alarm signal, controlling an alarm, and monitoring and controlling the setting of each NE 3 (setting of area attribute, setting of routing, etc.). The monitoring and controlling terminal 2 is also designed so as to be capable of generating and terminating an OSI packet for performing monitoring and controlling.

Further, the NE 3 transmits a monitoring and controlling packet (OSI packet) for performing NE control and line control, a data signal, and an IP packet, along with the main signal of SONET, to another NE 3 by the above-described DCC, and FIG. 1 shows how a plurality of NEs 3 (up to Y units) respectively constitute the above-mentioned area #0 in each DCN #X by being connected to each another as described above.

In other words, the monitoring and controlling network 1 in the present embodiment differs from a conventional one in that the entire monitoring and controlling network 1 is constituted by a plurality of DCNs #X and further, each DCN #X is constituted by only the single area #0. That is, by dividing the monitoring and controlling network 1 into a plurality of DCNs #X, it is made possible to increase the total number of NEs in the monitoring and controlling network 1 while keeping the number of NEs 3 in each DCN #X equal to or less than a manageable upper limit NE number (here, for example, Y=300) in an area.

Note that, as will be explained below using FIG. 2, the NEs 3-X-Y in FIG. 1 are connected by a transmission path, for example, an optical fiber, so as to form a ring-shaped network, a star-shaped network, a mesh-shaped network, or a network combining these shapes in accordance with geographical circumstances in which paths for transferring user data and NEs are arranged.

Figure 2:
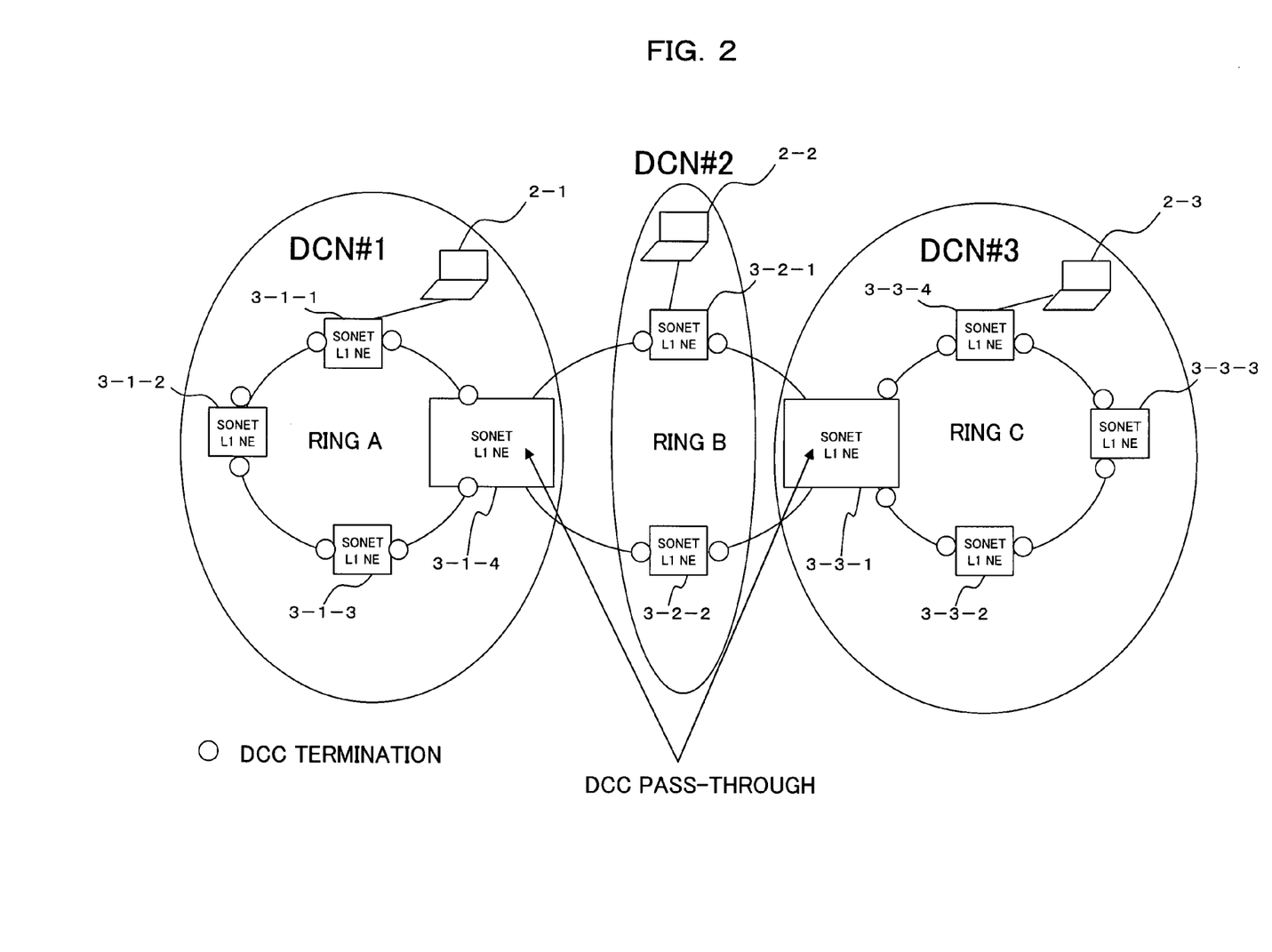
FIG. 2 is a diagram showing a path of a DCC in the monitoring and controlling network.

Here, the DCC processing method in the present embodiment is explained using FIG. 2 showing the path of the DCC between the respective DCNs #X.

In FIG. 2, for simplicity of explanation, it is assumed that the above-mentioned monitoring and controlling network 1 is constituted by three DCNs (DCN #1, DCN #2, DCN #3).

Here, the DCN #1 is constituted by connecting the monitoring and controlling terminal 2-1 and the NEs 3-1-1, 3-1-2, 3-1-3, and 3-1-4 connected in a ring shape (ring network A) and the DCN #2 is constituted by connecting the monitoring and controlling terminal 2-2 and the NEs 3-2-1 and 3-2-2 connected in a ring shape (ring network B). Further, the DCN #3 is constituted by connecting the monitoring and controlling terminal 2-3 and the NEs 3-3-1, 3-3-2, 3-3-3, and 3-3-4 connected in a ring shape (ring network C).

Then, as shown in FIG. 2, in the DCC processing method in the present embodiment, the NE 3 is designed so as to selectively perform termination processing of a signal (a signal including an OSI packet, an IP packet other than that, etc., and referred to as a DCC signal hereinafter) received by the DCC in accordance with an area attribute setting, and further, so as to capable of passing through a DCC signal (specifically an OSI packet) for which termination processing is not performed to another NE 3 belonging to an area other than the area (DCN) to which the NE 3 in question belongs.

For example, if attention is paid to the DCN #1, the DCC signal (OSI packet) generated in the DCN #1 is subjected to termination processing in each of the NEs 3-1-1, 3-1-2, 3-1-3, and 3-1-4, however, the OSI packet generated in the DCN #2 is passed through to the DCC in the neighboring DCN #2 as is without being subjected to termination processing in a transparent manner (in a transmissive manner) after being taken out from the DCC in the NE 3-1-4 in question due to the area attribute setting (pass-through setting) for the NE 3-1-4.

Similarly, if attention is paid to the DCN #3, the OSI packet generated in the DCN #3 is subjected to termination processing in each of the NEs 3-3-1, 3-3-2, 3-3-3, and 3-3-4, however, the OSI packet generated in the DCN #2 is passed through to the DCC in the neighboring DCN #3 as is without being subjected to termination processing in a transparent manner after being taken out from the DCC in the NE 3-3-1 in question due to the area attribute setting for the NE 3-3-1.

Then, if attention is paid to the DCN #2, the OSI packet generated in the DCN #2 is scheduled to be transmitted through the NE 3-2-1, the NE 3-1-4, the NE 3-2-2, and the NE 3-3-1, however, to be subjected actually to termination processing only in the NE 3-2-1 and the NE 3-2-2 arranged in the DCN #2, and is passed through to each DCC in the neighboring DCN #2 and DCN #3 in a transparent manner without being subjected to termination processing after being taken out from the DCC in the NE 3-1-4 and the NE 3-3-1.

As described above, by causing each DCC to have respective different area (DCN) attribute (path-through setting) while physically connecting each NE 3, it is made possible to perform area management by dividing a desired NE 3 as an NE belonging to a different DCN and also to construct a plurality of DCNs in one monitoring and controlling network 1.

At this time, for the DCC signal to be passed through, it is not necessary to perform routing processing and it is also not necessary to store address information for routing control about the signal in a memory for managing address information (not shown schematically), therefore, it is also made possible to save the amount of memory usage of the memory for managing address information.

Next, the termination processing and the pass-through processing method of the DCC are explained below using FIG. 3.

Figure 3:
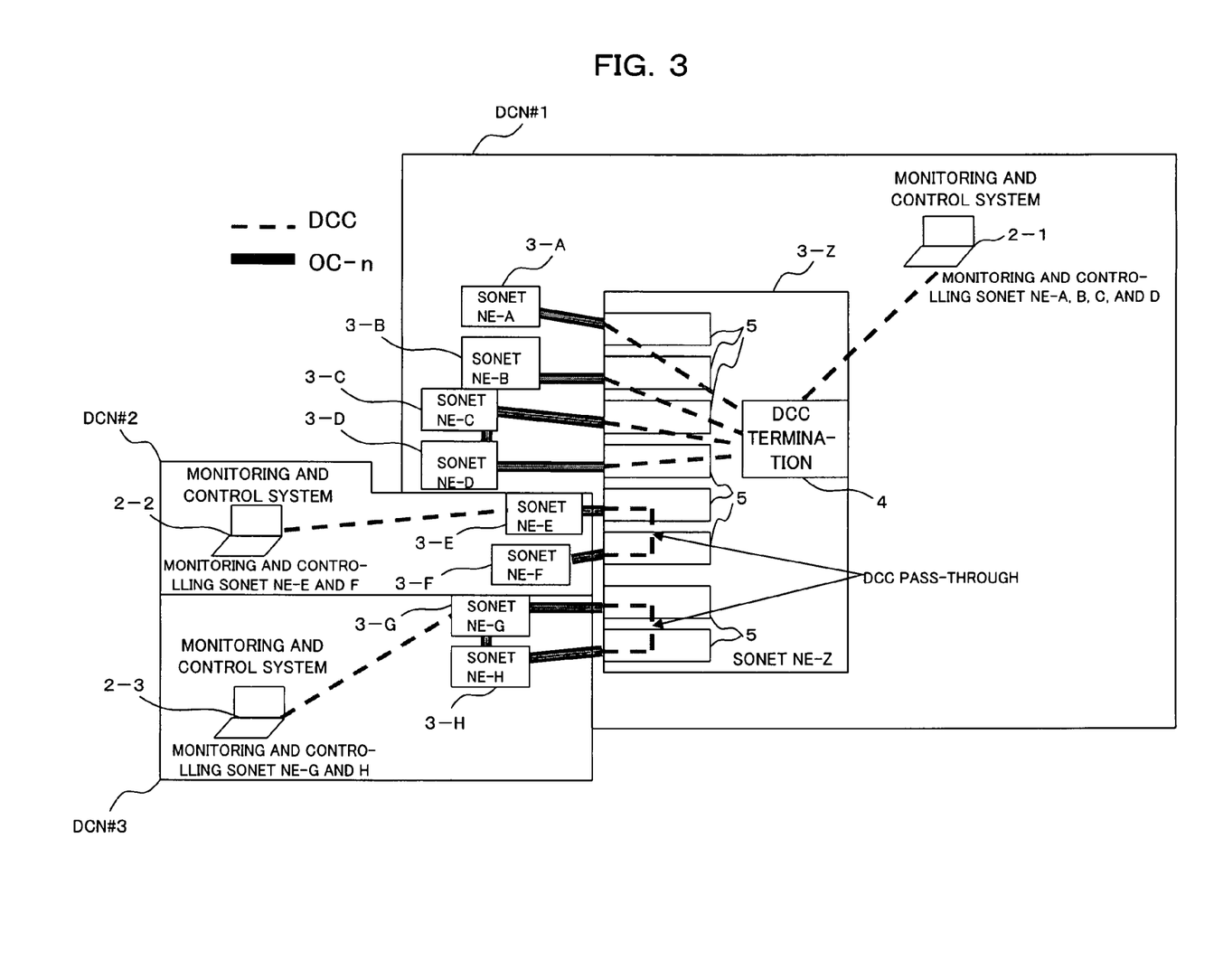
FIG. 3 is a block diagram showing a configuration of a transmission apparatus according to the embodiment of the present invention.
Figure 4:
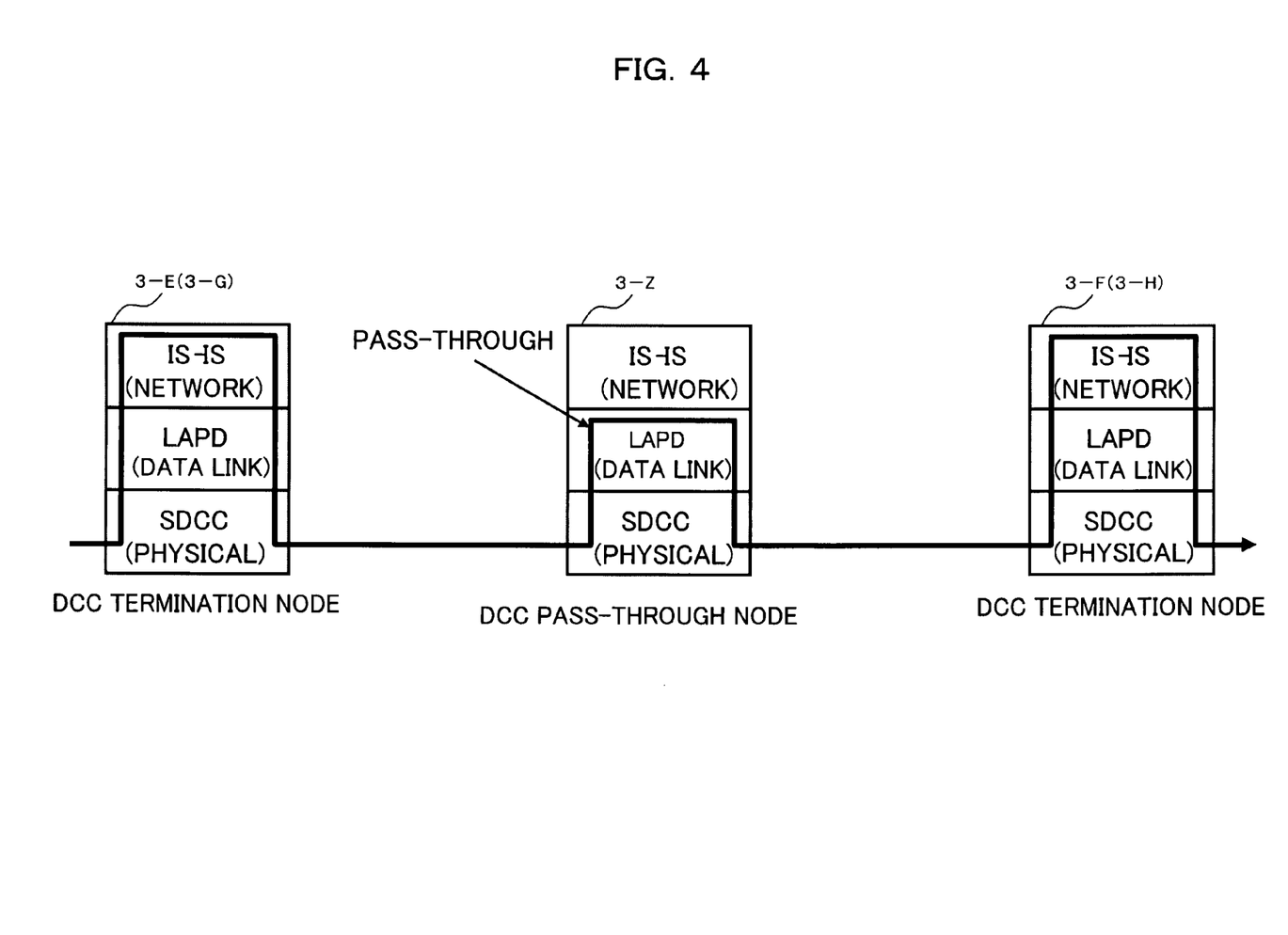
FIG. 4 is a block diagram showing a configuration of essential details of the transmission apparatus shown in FIG. 3.

In FIG. 3, for simplicity of explanation, it is assumed that to the DCN #1, the monitoring and controlling terminal 2-1 and the NEs 3-A, 3-B, 3-C, 3-D, and 3-Z belong and similarly, to the DCN #2, the monitoring and controlling terminal 2-2 and the NEs 3-E and 3-F belong, and further, to the DCN #3, the monitoring and controlling terminal 2-3 and NEs 3-G and 3-H belong. Incidentally, in the following explanation also, the NEs 3-A to 3-H, and 3-Z are simply referred to as the "NE 3" when a distinction is not made.

Then, the NE 3-Z is configured so as to comprise a data communication channel termination section 4 and a plurality of optical interfaces (OC-n ports) 5 for transmitting and receiving a main signal frame [OC (Optical Carrier)-n: n=3, 12, 48, 192, etc.] corresponding to the connection destinations NE-A to NE-H. Although not shown schematically, it is also assumed that other NEs 3 have the same configuration.

Here, the data communication channel termination section (data communication channel termination means) 4 of the NE 3-Z performs termination processing through the OC-n for which the DCC pass-through setting is not performed due to the area attribute setting, that is, performs termination processing of the DCC signal (OSI packet, IP packet, etc.) included in the SOH of the main signal frame received from any of the NEs 3-A to 3-D belonging to the same DCN #1 as the area to be monitored and controlled.

In contrast to this, the DCC signal through the OC-n port 5 for which the DCC pass-through setting is performed due to the area attribute setting, that is, the DCC signal included in the SOH of the main signal frame received from any of the NE 3-E and the NE 3-F belonging to the DCN #2 (or any of the NE-G and the NE-H belonging to the DCN #3) to be managed by being divided as an area to be monitored and controlled different from the DCN #1 to which the local apparatus belongs is, in principle, passed through in a transparent manner to the NE 3-E or the NE 3-F, or to the NE 3-G or the NE 3-H belonging to the DCN #2 or #3 other than the DCN #1 to which the local apparatus (NE-Z) belongs.

However, as already described, there may be the case where the DCC signal includes an IP packet for another purpose (function) such as confirmation of connection between neighboring NEs 3, besides the layer 3 level OSI packet, which is information (a signal) for monitoring and controlling, and in such the case, it is necessary to perform termination processing of the IP packet in question in order to maintain the compatibility with the already existing function (communication) and to pass through only the OSI packet.

Therefore, the signal received by the DCC is terminated to LAPD link (layer 2) level, a packet at layer 3 level is taken out, whether the packet in question is an OSI packet (specific monitoring and controlling signal) or an IP packet, and if the packet in question is not an OSI packet, termination processing is performed in the DCC termination section 4 as is the case of the DCC signal for which the DCC pass-through setting is not performed and if the packet in question is an OSI packet, the above-mentioned pass-through is performed.

Due to this, for example, a signal to be transmitted by the DCC belonging to the DCN #2 is, after terminated to layer 3 level among the SDCC (SONET Section Data Communications Channel) (layer 1) level, which is a physical layer, the LAPD (Link Access Procedure on D channel) link (layer 2) level, which is a data link layer, and the IS-IS (Intermediate System to Intermediate System) (layer 3) level, which is a network layer, in the NE 3-E (or the NE 3-G), which is the DCC termination node, terminated only to the LAPD (Data Link) link (layer 2) level in the NE 3-Z, which is the DCC pass-through node, and is passed through to the NE 3-F, which is the DCC termination node without being terminated to the IS-IS (Network) (layer 3) level. Then, the signal (OSI packet) in question is terminated to the IS-IS (Network) (layer 3) level in the NE 3-F (or the NE 3-H), which is the DCC termination node of the connection destination.

Figure 5:
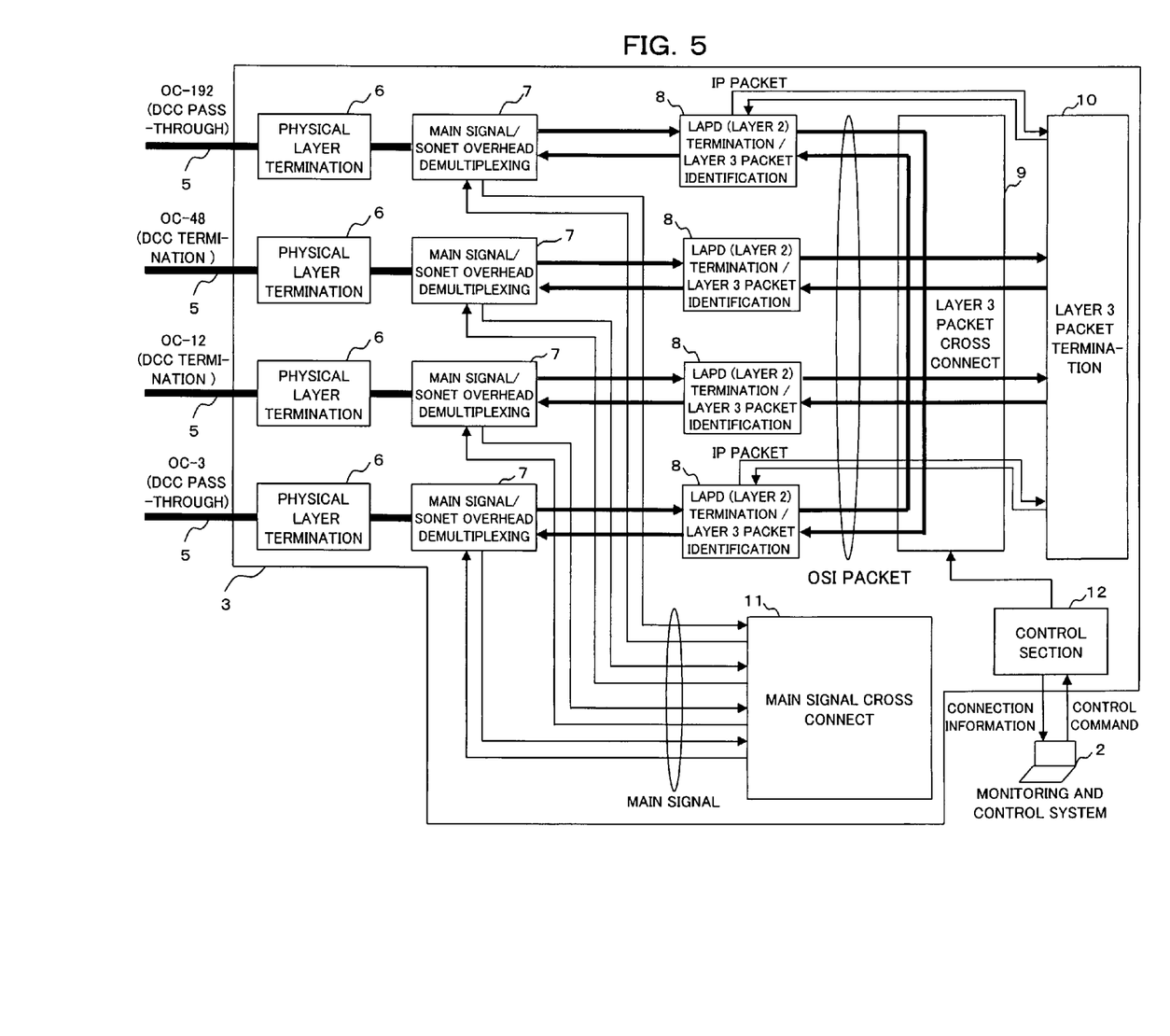
FIG. 5 is a block diagram for explaining the function of the transmission apparatus.

In order to realize the above-mentioned pass-through processing, if attention is paid to its essential configuration, the NE 3 in the present embodiment is configured so as to comprise, for example, a physical layer (layer 1) termination processing section 6, a main signal/SONET overhead demultiplexing processing section 7, an LAPD (layer 2) termination/layer 3 packet identification section 8, a layer 3 packet cross connect section 9, a layer 3 packet termination processing section 10, a main signal cross connect section 11, and a control section 12, as shown in FIG. 5. Here, the physical layer (layer 1) termination processing section 6, the main signal/SONET overhead demultiplexing processing section 7, and the LAPD (layer 2) termination/layer 3 packet identification section 8 are provided corresponding to the above-mentioned OC-n port (that is, the DCC included in a different main signal frame) 5 and in the example shown in FIG. 5, four sets are provided corresponding to the four different kinds of main signal frames (transmission rates) of OC-192, OC-48, OC-12, and OC-3. Incidentally, the number of sets is not limited to this and it is possible to adequately change the number in accordance with the number of OC-n ports 5 to be mounted.

Here, the layer 1 termination processing section 6 performs termination processing of the physical layer (layer 1) of the SONET signal of the OC-n and comprises functions of optical-electrical (OE) conversion and electrical-optical (EO) conversion.

Further, the main signal/SONET overhead demultiplexing processing section 7 demultiplexes the received signal subjected to optical-electrical conversion in the layer 1 termination processing section 6 into the overhead and the main signal, while generating a SONET signal (transmission signal) by adding the SONET overhead (SOH, LOH) to the main signal cross-connected at the main signal cross connect section 11. The demultiplexed received main signal is inputted to the main signal cross connect section 11 and the rest of the overhead is inputted to the layer 2 termination/layer 3 packet identification section 8 in the post-stage.

The layer 2 termination/layer 3 packet identification section (layer 2 termination processing section, layer 3 identification section) 8 performs termination processing of the demultiplexed overhead to the LAPD layer (layer 2) level and extracts the DCC signal (signal at layer 3 level) included in the SOH and further identifies whether the DCC signal in question is an OSI packet or an IP packet of a layer 3 packet (however, termination processing at layer 3 level is not performed) and the OSI packet is inputted to the layer 3 packet cross connect section 9 and the IP packet is inputted to the layer 3 packet termination processing section 10.

The layer 3 packet cross connect section (the layer 3 pass-through processing section and the data communication channel cross connect processing section) 9 selectively connects between any of the OCs-n in accordance with the pass-through setting (area attribute setting) from the control section 12 and cross-connects the OSI packet inputted when the received DCC signal is identified as the OSI packet by the layer 2 termination/layer 3 packet identification section 8 to the OC-n port 5 of the connection destination for which the pass-through setting is performed without performing termination processing.

The layer 3 packet termination processing section (layer 3 termination processing section) 10 performs termination processing of an IP packet other than the OSI packet identified by the layer 2 termination/layer 3 packet identification section 8. In other words, the layer 2 termination/layer 3 packet identification section 8 and the layer 3 packet termination processing section 10 function as the DCC termination section 4 (data communication channel termination means) for selectively performing termination processing of the signal received by the DCC in accordance with the area attribute setting and the layer 2 termination/layer 3 packet identification section 8 and the layer 3 packet cross connect section 9 function as the data communication channel pass-through means for passing through a signal (OSI packet) for which termination processing is not performed in the layer 2 termination/layer 3 packet identification section 8 and the layer 3 packet termination processing section 10 to the NE 3 belonging to an area other than the area to which the local NE 3 belongs.

The main signal cross connect section 11 performs cross connect processing of the main signal demultiplexed by the main signal/overhead byte demultiplexing processing section 7 in accordance with the main signal path setting.

Then, the control section (control means, pass-through setting information output section) 12 performs various controls and setting processing of the local NE 3 based on the control command received from the monitoring and controlling terminal 2 and for example, is designed so as to be capable of setting pass-through of the DCC by controlling the signal path within the layer 3 packet cross connect section 9, of outputting information about the OC-n port 5 for which the DCC pass-through is set and information about its connection destination NE 3 and OC-n port 5 (that is, connection information of DCC) to the monitoring and controlling terminal 2 to display on a display device such as its monitor (not shown schematically), etc.

Figure 6:
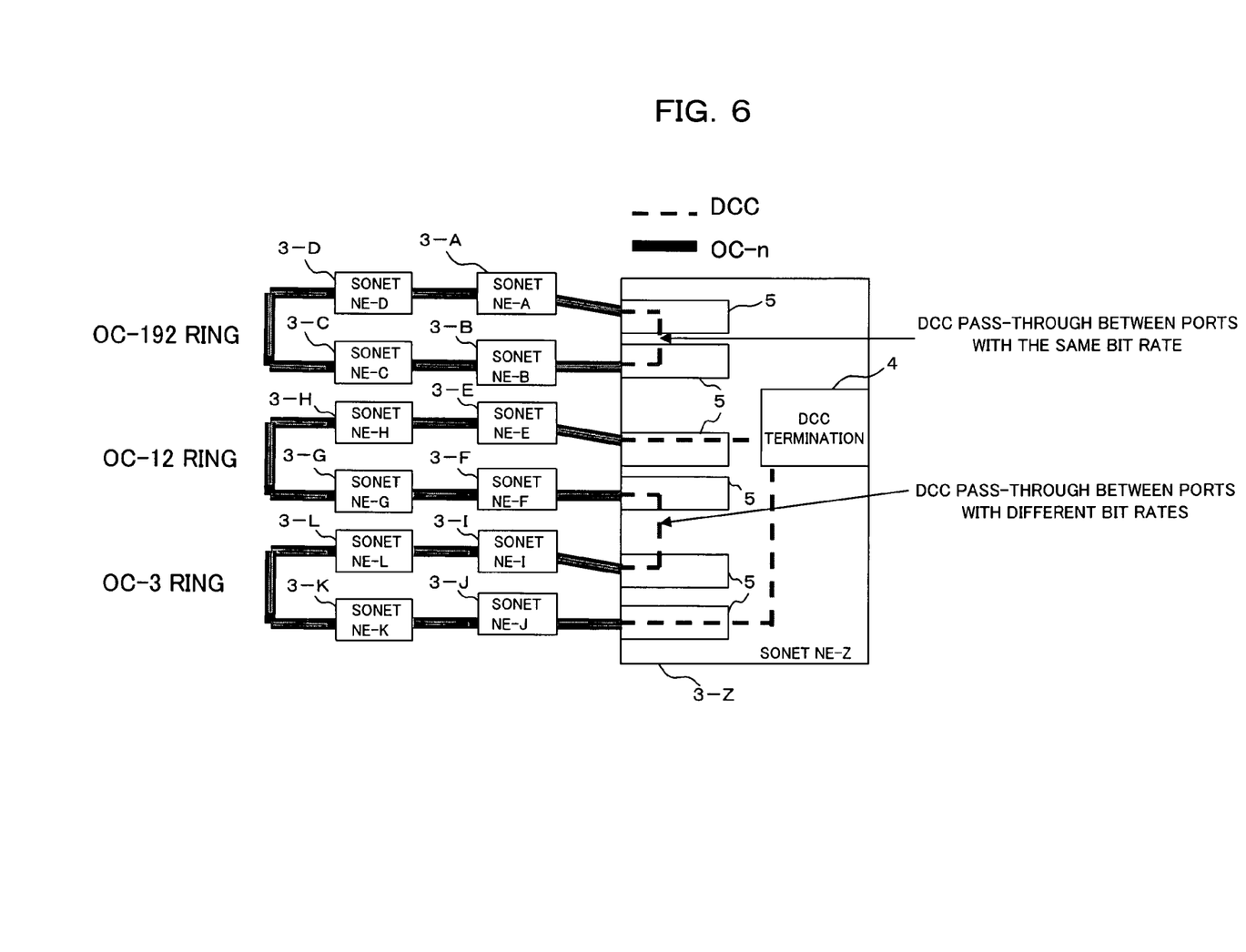
FIG. 6 is a block diagram showing an example of a connection configuration of a transmission apparatus according to the embodiment of the present invention.
Figure 7:
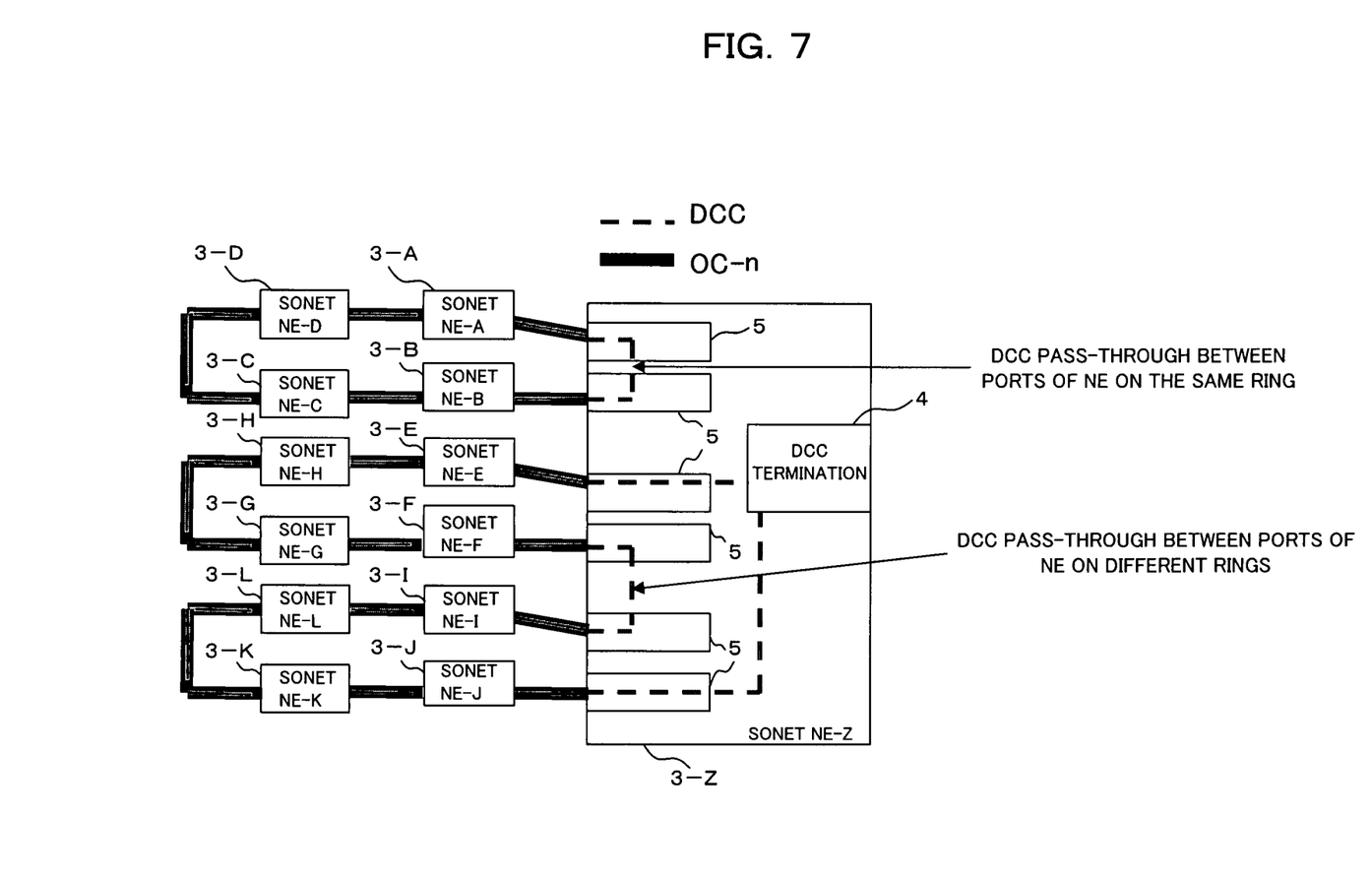
FIG. 7 is a block diagram showing an example of a connection configuration of a transmission apparatus according to the embodiment of the present invention.

As described above, by comprising the layer 3 packet cross connect section 9, the NE 3 in the present embodiment is capable of performing the pass-through setting freely for the DCC at an arbitrary port 5 irrespective of the bit rate and the network form, such as the pass-through setting between the ports 5 with the same transmission rate (bit rate) and between the ports 5 with different bit rates as shown in FIG. 6, or the pass-through setting between the ports 5 of the NE 3 on the same ring and between the ports 5 of the NE 3 on the different rings (protection group) by means of the control command, and of realizing a flexible network management form.

Figure 8:
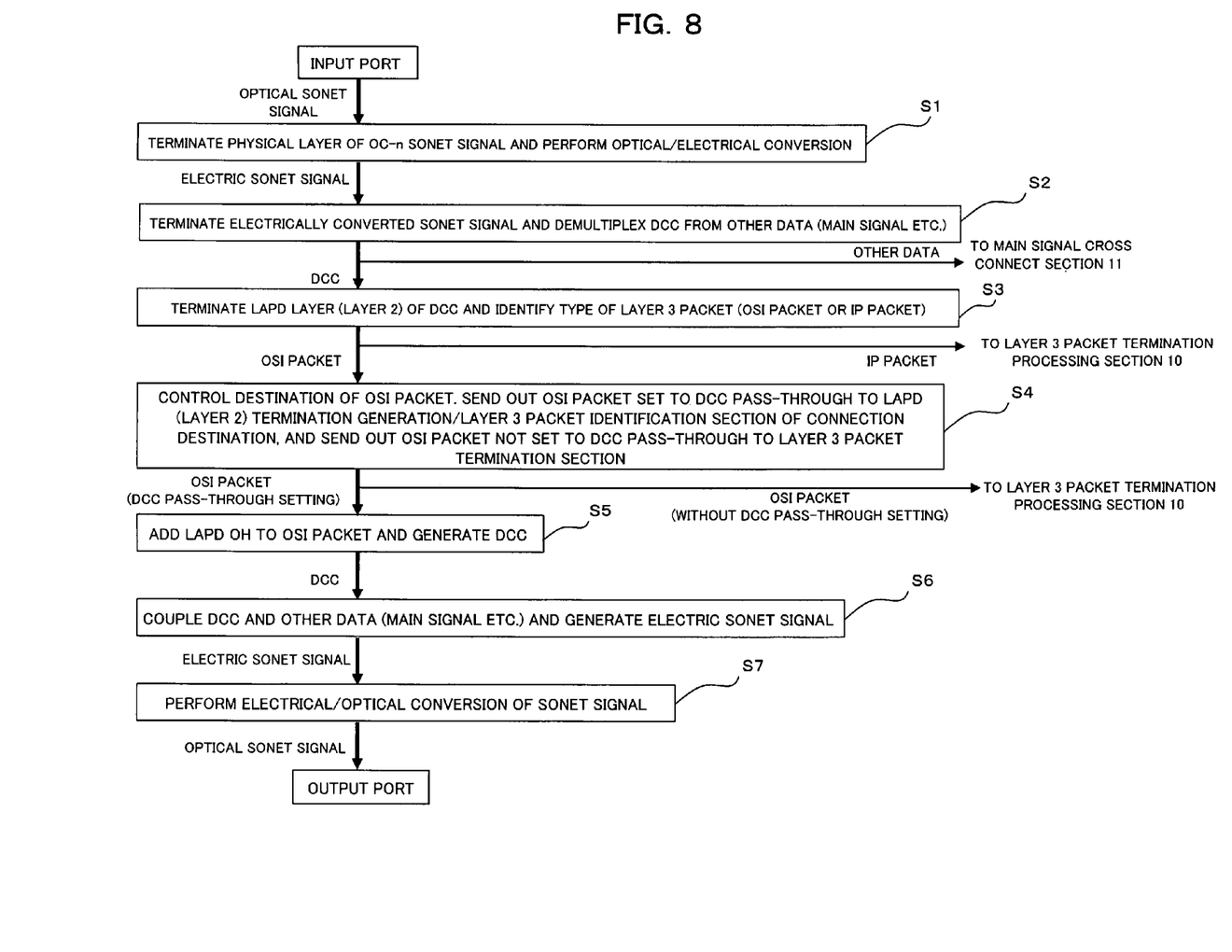
FIG. 8 is a flow chart for explaining the operation of the transmission apparatus shown in FIG. 4.

The operation of the transmission apparatus in the present embodiment configured as described above is explained below using a flow chart shown in FIG. 8.

First, the OC-n port (input port) 5 of the NE 3 receives a SONET signal (optical signal) and the received optical signal is inputted to the layer 1 termination processing section 6, and the physical layer (layer 1) is subjected to termination processing and optical-electrical (OE) conversion processing is performed (step S1).

Then, the SONET signal (electrical signal) outputted from the layer 1 termination processing section 6 is inputted to the main signal/SONET overhead demultiplexing processing section 7 and demultiplexed into the SONET overhead and the main signal (step S2), and the demultiplexed received main signal is inputted to the main signal cross connect section 11 and the remaining overhead is inputted to the layer 2 termination/layer 3 packet identification section 8 in the post-stage. Here, the received main signal inputted to the main signal cross connect section 11 is subjected to cross connect processing in accordance with the main signal path setting.

On the other hand, the demultiplexed SONET overhead is subjected to termination processing to the LAPD layer (layer 2) level by the layer 2 termination/layer 3 packet identification section 8 and the DCC signal included in the SOH is extracted and further, whether the DCC signal in question is the OSI packet or the IP packet of the layer 3 packet is identified (step S3). Then, when the DCC signal in question is the OSI packet, the OSI packet is inputted to the layer 3 packet cross connect section 9 and when the DCC signal in question is the IP packet, the IP packet is inputted to the layer 3 packet termination processing section 10. Here, the IP packet is subjected to termination processing by the layer 3 packet termination processing section 10.

Next, when the OSI packet is set to pass-through (area attribute setting) by the control section 12, the OSI packet is cross-connected to the connection destination OC-n port 5 set to pass-through without being subjected to termination processing by the layer 3 packet cross connect section 9 that selectively connects between arbitrary ones of the OC-n ports 5 in accordance with the pass-through setting, and other OSI packets are inputted to the layer 3 packet termination processing section 10 and subjected to termination processing (step S4).

Then, the OSI packet for which the pass-through is set is inputted to the layer 2 termination/layer 3 packet identification section 8 corresponding to the connection destination OC-n port 5, the LAPD link (layer 2) overhead is attached thereto, and sent out to the main signal/SONET overhead demultiplexing processing section 7 corresponding to the connection destination OC-n port 5 as a DCC signal (step S5).

The DCC signal is subjected to coupling processing with the main signal cross-connected in the main signal cross connect section 11 by the main signal/SONET overhead demultiplexing processing section 7 and sent out to the layer 1 termination processing section 6 corresponding to the connection destination OC-n port 5 as a SONET signal (electrical signal) (step S6).

Next, the SONET signal (electrical signal) is subjected to electrical-optical (EO) conversion processing (step S7) by the layer 1 termination processing section 6 and sent out to the cross connect (pass-through) destination OC-n port (output port) 5 as a SONET signal (optical signal).

Due to this, it is possible to accurately perform pass-through of the OSI packet while performing necessary termination processing of a signal (main signal, IP packet, etc.) other than the OSI packet among the signals at layer 3. Therefore, it is possible to realize construction of the monitoring and controlling network 1 by flexible area division while maintaining the compatibility of communication required between the NEs 3 by an already existing DCC. Further, it is possible to perform the pass-through setting freely for the DCC at an arbitrary OC-n port 5 irrespective of the transmission rate (bit rate) of the main signal frame included in the DCC and the network form through which the main signal frame transmits and to realize a more flexible network management form.

Therefore, even if the number of NEs 3 to be monitored and controlled by the DCC increases, it is possible to easily perform management by dividing the area so that the number of NEs 3 that can be managed in one area is equal to or less than the maximum number by means of the area attribute setting. As a result, it is possible to flexibly realize construction of a communication network relating to the monitoring and controlling OSI packet in accordance with a network management form desired by a user or without the need to make a considerable modification to an already existing network management form.

An embodiment of the present invention is explained in detail as above, however, the present invention is not limited to each embodiment described above and it is possible to make arbitrary modifications without departing from the gist of the present invention.

What is claimed is:

1. A transmission apparatus comprising:
   a reception port configured to receive a frame;
   a demultiplexer configured to demultiplex the received frame into an overhead and a payload;
   an identifier configured to identify whether a DCC (Data Communication Channel) signal included in the demultiplexed overhead is an IP packet or an OSI (Open System Interconnection) packet;
   a packet terminator configured to terminate a packet;
   a determiner configured to determine whether to pass through or to terminate the DCC signal included in the demultiplexed overhead; and
   a transmission port configured to transmit the DCC signal determined to be passed through, wherein
   whether or not to terminate the DCC signal is set for the reception port,
   the determiner determines whether to pass through or to terminate the DCC signal included in the demultiplexed overhead based on the setting for the reception port and transmits the DCC signal determined to be terminated to the packet terminator, and
   the identifier transmits the IP packet to the packet terminator when the DCC signal is identified to be an IP packet.

2. The transmission apparatus according to claim 1, wherein whether or not to terminate the DCC signal is set for the reception port based on an area to which the transmission apparatus belongs.

3. A method for controlling a transmission apparatus, the method comprising:
   setting whether or not to terminate a DCC (Data Communication Channel) signal for a reception port;

receiving a frame through the reception port;
demultiplexing the received frame into an overhead and a payload;
identifying, by an identifier, whether the DCC signal included in the demultiplexed overhead is an IP packet or an OSI (Open System Interconnection) packet;
determining whether to pass through or to terminate the DCC signal included in the demultiplexed overhead based on the setting for the reception port;
transmitting the DCC signal determined to be passed through from a transmission port;
transmitting the DCC signal determined to be terminated to a packet terminator;
transmitting, from the identifier to the packet terminator, the IP packet when the DCC signal is identified to be an IP packet by the identifier; and
terminating a packet by the packet terminator.

4. The method according to claim 3, wherein the setting is based on an area to which the transmission apparatus belongs.

* * * * *